United States Patent [19]

Akiyama et al.

[11] Patent Number: 4,516,811
[45] Date of Patent: May 14, 1985

[54] SLIDER MECHANISM FOR A VEHICLE SEAT

[75] Inventors: Yoshinori Akiyama, Yokohama; Shinichi Nishimura, Zama; Isamu Harigaya, Tokyo, all of Japan

[73] Assignees: Nissan Motor Company, Ltd.; Ohi Seisakusho Company, Ltd., both of Yokohama, Japan

[21] Appl. No.: 464,508

[22] PCT Filed: May 28, 1982

[86] PCT No.: PCT/JP82/00208
§ 371 Date: Jan. 27, 1983
§ 102(e) Date: Jan. 27, 1983

[87] PCT Pub. No.: WO82/04228
PCT Pub. Date: Dec. 9, 1982

[30] Foreign Application Priority Data

May 29, 1981 [JP] Japan ................... 56-80724

[51] Int. Cl.³ .................. B60N 1/08; F16M 13/00; F16C 29/02
[52] U.S. Cl. ........................ 308/3 R; 308/3.6; 248/429; 296/65 R; 312/341 NR
[58] Field of Search .................. 308/3 R, 3.6, 3 A; 312/341 R, 341 NR, 334, 338, 343, 350; 248/429; 296/65 R; 297/317, 346

[56] References Cited

U.S. PATENT DOCUMENTS

| 2,606,091 | 8/1952 | Buchy et al. ........... 312/341 NR X |
| 2,927,627 | 3/1960 | Lohr ........................ 248/429 |
| 3,313,512 | 4/1967 | Colautti et al. ......... 296/65 R X |
| 3,356,257 | 12/1967 | Eimer ....................... 220/89 B |
| 3,476,435 | 11/1969 | Hitzelberger ............ 296/65 R |
| 3,847,452 | 11/1974 | Harder ............... 312/341 NR X |
| 3,930,632 | 1/1976 | Shigeta et al. ............ 248/429 |
| 4,210,303 | 7/1980 | Torta et al. ........... 296/65 R X |
| 4,395,011 | 7/1983 | Torta .................... 248/429 X |

FOREIGN PATENT DOCUMENTS

| 2364797 | 7/1974 | Fed. Rep. of Germany . |
| 53-33936 | 8/1978 | Japan . |
| 55-13152 | 3/1980 | Japan . |
| 1446639 | 8/1976 | United Kingdom . |

*Primary Examiner*—John Petrakes
*Assistant Examiner*—David Werner
*Attorney, Agent, or Firm*—Schwartz, Jeffery, Schwaab, Mack, Blumenthal & Evans

[57] ABSTRACT

In a slider mechanism for a vehicle seat, a synthetic resin slider block (14) is molded on a movable rail (15), and the slider block (14) slidably engages a guide groove (13) formed in a fixed rail (2). The slider block (14) is formed with an anchor (14e) which can engage a cut-out(s) (23) formed in the movable rail (1) so as to hold the slider block onto the movable rail, and a thin portion (14e) which is thinner than the other portions of the block. Thus, the inventive slider mechanism does not require highly accurate manufacture of the movable rail, and can prevent rattling of the seat in the assembled state.

9 Claims, 9 Drawing Figures

SLIDER MECHANISM FOR A VEHICLE SEAT

FIELD OF THE INVENTION

The present invention relates to a slider mechanism for moving a vehicle seat forwards or backwards, and more particularly, a slider mechanism which is disposed between a fixed rail and a movable rail arranged between a vehicle seat and a vehicle floor so as to allow the movable rail to be slidably engaged with the fixed rail.

BACKGROUND OF THE INVENTION

A conventional slider mechanism for a vehicle seat is constituted in such a manner that a synthetic resin slider is secured to a movable rail fixed to a seat and the slider is formed a groove for engaging with a fixed rail fixed to a vehicle floor so as to allow the movable rail to slide with respect to the fixed rail. This type of slider mechanism may generate rattling and other unpleasant noises on account of manufacturing errors in several dimensions, such as the clearance between the fixed rail and the movable rail, the thickness of the fixed rail and the width of the groove formed in the slider, the width of a groove-engaging portion of the fixed rail which engages with the groove and the depth of the groove, etc.

In addition, the groove-engaging portion of the fixed rail is usually composed of a flange which extends laterally from the fixed rail body. Thus, the flange will be exposed when the seat is moved so that this will not only possibly spoil the good appearance of passenger compartment interior but also damage the shoes or socks of the passenger.

Therefore, it is an object of the present invention to provide a slider mechanism which can overcome the above described conventional problems, does not require high-accuracy manufacture, and will not spoil the good appearance of the interior of the vehicle.

According to the present invention, the slider mechanism does not require high accuracy, can ensure the engagement between the fixed rail and the movable rail, and simplify the manufacturing process.

SUMMARY OF INVENTION

To accomplish the above object, a slider mechanism for a vehicle seat according to the present invention comprises a fixed rail which is fixed to a floor, a movable rail which is fixed to a seat and allowed to slidably engage with the fixed rail, and a synthetic resin slider block which is integrally molded to either the fixed rail or the movable rail and disposed between the fixed rail and the movable rail so as to slidably contact the other rail. The slider block includes an anchor member which secures the attachment to either the fixed rail or the movable rail so as to prevent the slider block from disengaging from the corresponding rail. In addition, it is preferable to form thin portions in the slider block so as to specify the location of cracks or breaks of the slider block which may be caused by the difference between the coefficients of thermal expansion of the slider block and the rail.

According to an embodiment of the present invention, a slider mechanism for a vehicle seat comprises;
 a fixed rail which is fixed to a vehicle floor;
 a movable rail which is fixed to a vehicle seat and engaged with the above-mentioned fixed rail; and
 a synthetic resin slider block which is molded to one of the above mentioned rails so as to slidably contact the other rail.

BRIEF DESCRIPTION OF THE DRAWINGS

The invention will be understood more fully from the detailed description given herebelow and from the accompanying drawings of the preferred embodiment of the present invention, which, however, should not be taken as limitative to the invention but for explanation or elucidation only.

In the drawings.

DESCRIPTION OF THE PREFERRED EMBODIMENT

Figure 1:
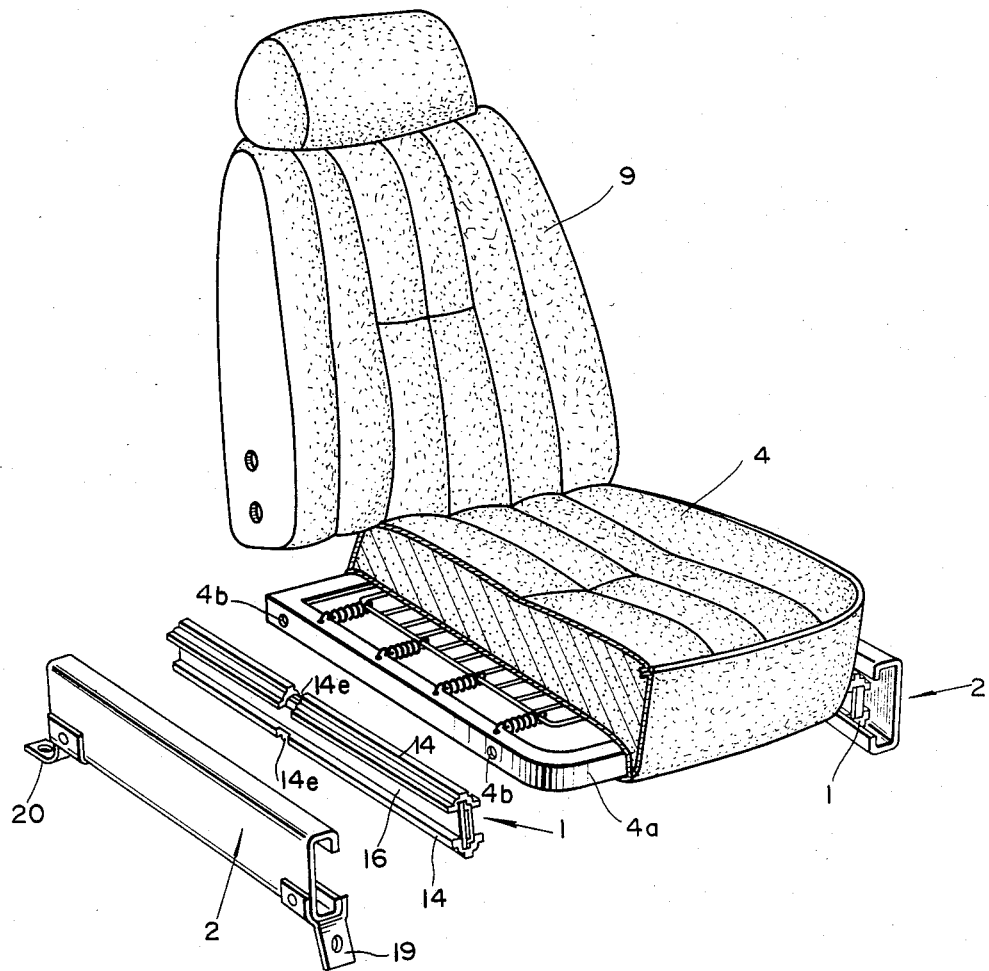
FIG. 1 is a perspective view of a vehicle seat which is equipped with a slider mechanism according to a preferred embodiment of the present invention.
Figure 5:
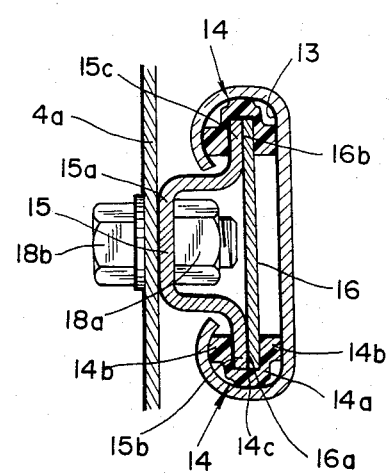
FIG. 5 is a sectional view taken along the line V—V in FIG. 3.

An embodiment of the present invention will be explained with reference to the accompanying drawings. FIG. 1 shows a vehicle seat which is equipped with a slider mechanism according to a preferred embodiment of the present invention. The vehicle seat mainly consists of a seat back 9 and a seat cushion 4. The seat cushion 4 is supported by a cushion frame 4a, each of the two sides of which is fixedly provided with a movable rail 15 through a nut 18a secured by welding to the movable rail and a fixing bolt 18b as shown in FIG. 5. Each movable rail 15 is composed of a main body 15a with a channel-shaped cross-section, and flanges 15b and 15c formed by turning the free edges of the main body upwards and downwards respectively. The flanges 15b and 15c of the movable rail 15 are fixed to upper and lower edges 16a, 16b of a reinforcing member 16, respectively. Furthermore, synthetic resin slider blocks 14 are molded to the fixed edges of the flanges 15b, 15c and the upper and lower edges 16a and 16b of the reinforcing member. A movable rail assembly 1 consisting of the movable rail 15, the reinforcing member 16, and the slider blocks 14 slidably engages a fixed rail 2. The fixed rail 2 has a substantially C-shaped cross-section with a guide groove 13 in the bends at the upper and lower ends thereof so as to allow the slider block 14 to be slidably housed therein. The fixed rail 2 is fixed to a vehicle floor panel 3 by fixing bolts 21, 22 through brackets 19, 20.

Figure 2:
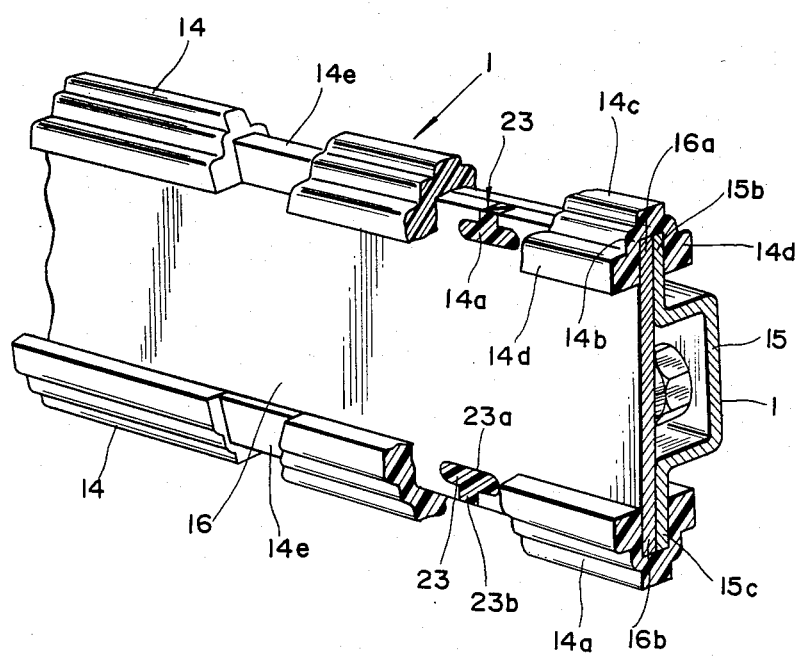
FIG. 2 is an enlarged perspective view of the slider mechanism according to FIG. 1.
Figure 3:
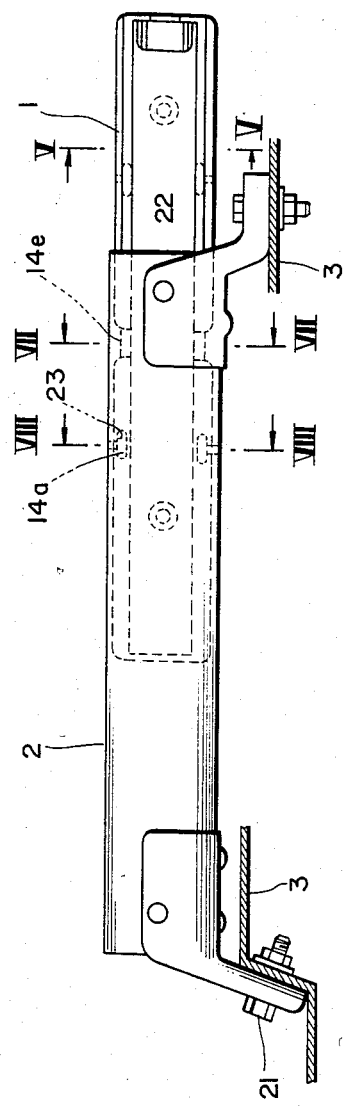
FIG. 3 is a side view of the slider mechanism according to FIG. 1.
Figure 8:
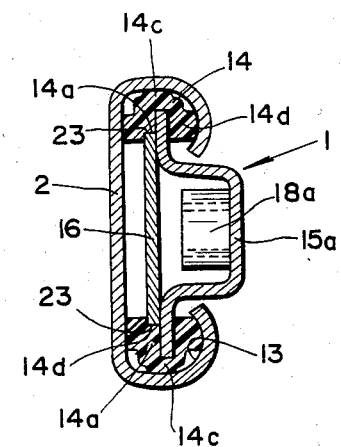
FIG. 8 is a sectional view taken along the line VIII—VIII in FIG. 3.

FIGS. 2 to 8 show the above-mentioned slider mechanism in detail. As shown in FIGS. 2, 3 and 8, the upper and lower edges 16a, 16b of the reinforcing member 16 each include a cut-out 23. The cut-out 23 includes a substantially elliptical portion 23a and an open portion 23b which is narrower than the portion 23a and the end of which passes through the edge of the upper or lower edge 16a, 16b. In this cut-out 23, an anchor 14a is formed of the synthetic resin which is injected therein during molding and then cured therein.

Figure 6:
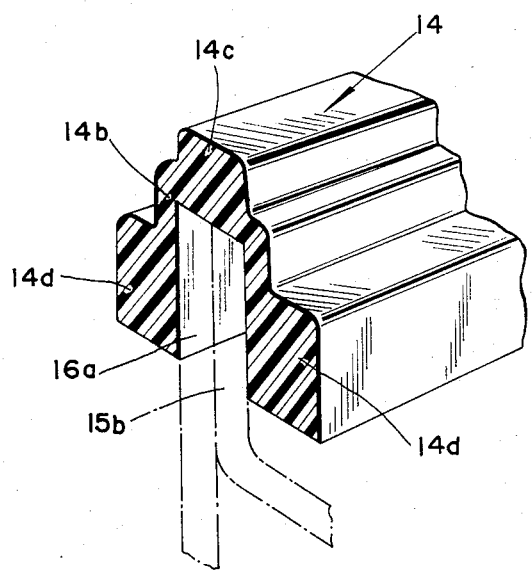
FIG. 6 is an enlarged perspective view of a slider block for the slider mechanism according to FIG. 2.
Figure 7:
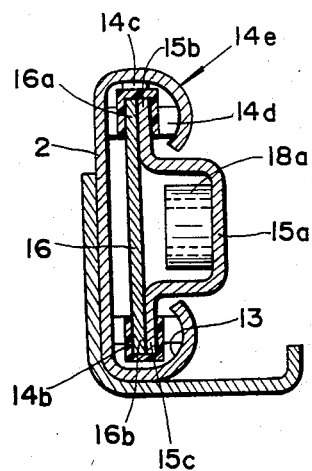
FIG. 7 is a sectional view taken along the line VII—VII in FIG. 3.

The slider block 14 comprises, as shown in FIG. 6, a base portion 14b which engages the flange member 15b or 15c of the movable rail 15 and the upper edge 16a or lower edge 16b of the reinforcing member 16, a portion 14c extending upwards or downwards from the base portion, and a portion 14d extending laterally from both sides of the base portion. In addition, as shown in FIG. 2, the slider block 14 is provided with a thin portion 14e which does not include the portions 14c and 14d and which extends along the longitudinal direction of the block. The thin portion 14e can specify the part of the slider block to be broken on account of stretching forces generated in the slider block due to the difference between the coefficients of linear expansion of the metal material used for the movable rail, for example iron, and the synethetic resin material of the slider block. That is, when the ambient temperature changes from a normal temperature to a lower temperature, the resin slider block 14 which has a larger coefficient of linear expansion than the iron will contract remarkably in the longitudinal direction. However, since the slider block is fixed at both ends to the movable rail 15, the slider block is stretched towards the ends of the rail 15 so that only the thin portion 14e, being relatively weak, will be broken.

Nevertheless, since the anchors 14a arranged in suitable places securely engage with the movable rail assembly, the slider block 14 can not be torn off the movable assembly even if the thin portion 14e breaks.

On the other hand, when the ambient temperature varies from a normal temperature to a high temperature, the slider block 14 expands so that the slider block will be forcedly torn from the movable rail 15. However, since the slider block is securely held by the engagement between the anchors 14a and the cut-outs 23 in the reinforcing member, the slider block is maintained securely in position. Thus, even when the ambient temperature is relatively high or low, the external dimensions of each portion of the slider block 14 remain constant and dimensional accuracy is thus stable.

Figure 9:
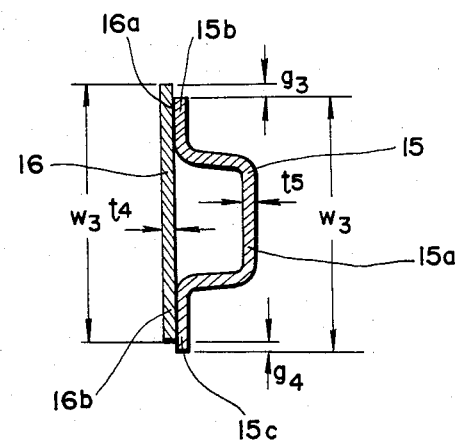
FIG. 9 is a sectional view of a movable rail of the slider mechanism in FIG. 1.

In accordance with the present invention as mentioned above, as shown in FIG. 9, the dimensional error between the movable rail and the reinforcing member constituting the movable assembly, i.e. errors in the thicknesses $t_5$ and $t_4$ of the movable rail and the reinforcing member, errors between the widths $W_3$ of the movable rail and the reinforcing member, errors $g_3$ and $g_4$ caused during assembly thereof, and so on, can be compensated for by forming the slider block in such manner that molten synthetic resin is injected and molded in a mold having fixed dimensions. Accordingly, the engagement between the movable rail assembly and the fixed rail will not rattle.

Figure 4:
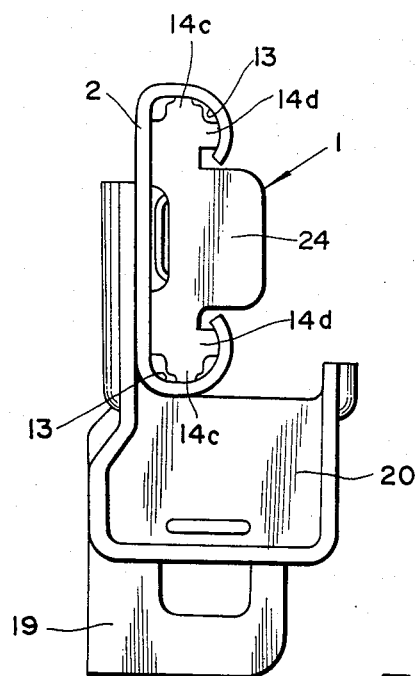
FIG. 4 is an elevational view of the slider mechanism of FIG. 1.

During molding of the slider block 14 to the movable rail 15 and the reinforcing member 16, both of longitudinal ends thereof are also provided with resin covers 24 as shown in FIG. 4 so that the movable rail and the reinforcing member will not be exposed even if the seat is moved to the rear-end position. Thus, the passenger's shoes or socks can be protected from damage.

Although the above mentioned embodiment shows an example in which the cut-out(s) for engaging the anchor(s) of the slider block is (are) formed in the reinforcing member, it is naturally possible to form the cut-out(s) in the movable rail. Furthermore, in the above-mentioned embodiment, the slider block is so formed as to slidably contact the guide groove 13 at three points. However, it is also possible to arrange four contact points or more.

Next, manufacture of the slider mechanism and assembly thereof onto a seat according to the above embodiment will be explained. The reinforcing member 16 has a rectangular shape including cut-out(s) 23. On the other hand, the movable rail 15 is formed with a mounting hole at the position corresponding to a mounting hole 4b formed in the cushion frame 4a and a nut 18a is welded to the external side of the hole. Then, the flange members 15a, 15c of the movable rail 15 and the upper and lower edges 16a, 16b of the reinforcing member 16 are welded together. The assembly composed of the movable rail and the reinforcing member is inserted into a mold and then synthetic resin is injected into the mold so that the resin slider block 14 with the anchor(s) 14a and the thin portion 14e is formed.

The movable rail assembly 1 formed in the manner described above is mounted onto the cushion frame by passing the fixing bolt 18b through the mounting hole 4b and engaging it with the nut 18a. The fixed rail 2 welded to the brackets 19, 20 is attached to the movable assembly 1 in this state and then stoppers for the movable rail assembly are provided in a well-known manner. Then, the fixed rail is fixed to the vehicle floor via the brackets 19 and 20 by means of fixing bolts.

In this manner, according to the embodiment disclosed above, the objects of the present invention can be achieved.

We claim:
1. A slider mechanism for a vehicle seat comprising:
   a fixed rail which is fixed to a vehicle floor;
   a movable rail which is fixed to a vehicle seat and so arranged as to slidingly engage said fixed rail; and
   a pair of synthetic resin slider blocks, each of which is molded in place around an edge portion of one of said rails where said one of said rails slidingly contacts the other rail, each said slider block being integrally formed with a holding means permanently locked in a recess formed in said edge portion of said one of said rails to hold said slider block onto said one of said rails, and each of said slider blocks extending along approximately the overall length of the associated edge portion of said one of said rails and being formed with an intermediate discontinuous portion of smaller cross-section.

2. The slider mechanism according to claim 1, wherein said slider block includes a main body (14b) which is adapted to engage said edge portion of said one of said rails, and a projecting portion (14c, 14d) which extends outwardly from the main body so as to contact the other of said rails.

3. The slider mechanism according to claim 2, wherein each said slider block includes at least three projecting portions so as to contact said other rail at at least three points.

4. The slider mechanism according to claim 3, wherein the above-mentioned discontinuous portion (14e) is composed of a thin portion of the slider block.

5. The slider mechanism according to claim 1, wherein said discontinuous portion (14e) is thinner than the remaining portion so that fracture sites can be specified for when the slider block is subject to a stretching force.

6. A slider mechanism for a vehicle seat comprising:

a fixed rail fixed to a vehicle floor and formed with an essentially C-shaped configuration having an internal space therein;

a movable rail fixed to the vehicle seat and so arranged to be slidingly received within said internal space of said fixed rail, said movable rail having upper and lower edge portions adapted to establish sliding contact with said fixed rail for sliding movement of said vehicle seat relative to the vehicle floor, and said movable rail being formed with cut-outs respectively opening through at least one of said upper and lower edge portions;

synthetic resin slider blocks molded in place around both of said upper and lower edge portions of said movable rail, said slider blocks having extensions permanently locked within said cut-outs for fixingly holding the slider blocks onto the upper and lower edge portions of said movable rail and having slider projections of said movable rail and having slider projections contacting the internal periphery of said fixed rail for sliding movement of said movable rail relative to said fixed rail; and means for defining discontinuities in said slider projections in the longitudinal direction thereof for specifying portions of said sliders at which fracture in response to thermal deformation of the slider block occurs.

7. The slider mechanism according to claim 6, wherein said slider block includes a main body (14b) which is adapted to engage said movable rail, and said slider projections (14c, 14d) extend outwardly from the main body so as to contact the fixed rail.

8. The slider mechanism according to claim 7, wherein said slider block includes at least three slider projections so as to contact the internal periphery of said fixed rail at at least three points.

9. The slider mechanism according to claim 6, wherein said discontinuities comprise thin portions of the slider block.

* * * * *